US010331753B1

(12) United States Patent
Zhang et al.

(10) Patent No.: US 10,331,753 B1
(45) Date of Patent: Jun. 25, 2019

(54) EFFICIENT PROGRESSIVE CONTINUOUS K-NEAREST NEIGHBOR QUERY ALGORITHM FOR MOVING OBJECTS WITH A TREE-LIKE INDEX

(71) Applicant: Jing Tong, Coral Gables, FL (US)

(72) Inventors: Mingjin Zhang, Miami, FL (US); Naphtali Rishe, Miami Beach, FL (US); Weitong Liu, Redwood City, CA (US); Jahkell Lazarre, Miami, FL (US); Tao Li, Coral Gables, FL (US)

(73) Assignee: The Florida International University Board of Trustees, Miami, FL (US)

(*) Notice: Subject to any disclaimer, the term of this patent is extended or adjusted under 35 U.S.C. 154(b) by 0 days.

(21) Appl. No.: 15/945,222

(22) Filed: Apr. 4, 2018

(51) Int. Cl.
  *G06F 16/9537* (2019.01)
  *G06F 16/29* (2019.01)
  *G06K 9/62* (2006.01)
  *H04W 4/02* (2018.01)

(52) U.S. Cl.
  CPC ......... *G06F 16/9537* (2019.01); *G06F 16/29* (2019.01); *G06K 9/6276* (2013.01); *H04W 4/023* (2013.01)

(58) Field of Classification Search
  None
  See application file for complete search history.

(56) References Cited

U.S. PATENT DOCUMENTS

| 7,016,781 | B1* | 3/2006 | Wolfson | G01C 21/3415 340/988 |
|---|---|---|---|---|
| 8,566,030 | B1* | 10/2013 | Demiryurek | G01C 21/3492 701/409 |
| 2005/0071083 | A1* | 3/2005 | Chen | G06Q 10/08 705/28 |
| 2005/0096841 | A1* | 5/2005 | Gedik | G06F 17/30333 701/408 |
| 2013/0251269 | A1* | 9/2013 | Chehaiber | G06F 17/30247 382/197 |

(Continued)

OTHER PUBLICATIONS

Iwerks, Glenn S., Hanan Samet, and Ken Smith. "Continuous k-nearest neighbor queries for continuously moving points with updates." Proceedings of the 29th international conference on Very large data bases—vol. 29. VLDB Endowment, 2003. (Year: 2003).*

(Continued)

*Primary Examiner* — Alex Gofman
*Assistant Examiner* — Umar Mian
(74) *Attorney, Agent, or Firm* — Saliwanchik, Lloyd & Eisenschenk

(57) ABSTRACT

Methods and systems for computing continuous k nearest neighbor (CkNN) queries in location based services for moving objects, to produce ordered kNN query results in a continuous and progressive manner, are provided. One method comprises receiving a continuous k nearest neighbor query, computing the initial set comprised of the k interest points nearest to the reference point and a set of remaining nodes stored in a distance-priority queue, generating and storing split points in a min-heap, iteratively moving current reference point to the nearest split point, swapping interest points, updating the corresponding split points in the min-heap, and reporting the kNN result progressively until a termination condition is reached.

18 Claims, 8 Drawing Sheets

(56) References Cited

U.S. PATENT DOCUMENTS

2015/0039217 A1* 2/2015 Deshpande .............. G08G 1/20
                                                      701/300

OTHER PUBLICATIONS

Tao, Yufei, Dimitris Papadias, and Qiongmao Shen. "Continuous nearest neighbor search." Proceedings of the 28th international conference on Very Large Data Bases. VLDB Endowment, 2002. (Year: 2002).*
Benetis, Rimantas, et al. "Nearest neighbor and reverse nearest neighbor queries for moving objects." Database Engineering and Applications Symposium, 2002. Proceedings. International. IEEE, 2002. (Year: 2002).*
Mouratidis, Kyriakos, Dimitris Papadias, and Marios Hadjieleftheriou. "Conceptual partitioning: An efficient method for continuous nearest neighbor monitoring." Proceedings of the 2005 ACM SIGMOD international conference on Management of data. ACM, 2005. (Year: 2005).*
Tao, Yufei, and Dimitris Papadias. "Time-parameterized queries in spatio-temporal databases." Proceedings of the 2002 ACM SIGMOD international conference on Management of data. ACM, 2002. (Year: 2002).*
Yu, Xiaohui, Ken Q. Pu, and Nick Koudas. "Monitoring k-nearest neighbor queries over moving objects." Data Engineering, 2005. ICDE 2005. Proceedings. 21st International Conference on. IEEE, 2005. (Year: 2005).*
Xiong, Xiaopeng, Mohamed F. Mokbel, and Walid G. Aref. "Sea-cnn: Scalable processing of continuous k-nearest neighbor queries in spatio-temporal databases." Data Engineering, 2005. ICDE 2005. Proceedings. 21st International Conference on. IEEE, 2005. (Year: 2005).*

* cited by examiner

EFFICIENT PROGRESSIVE CONTINUOUS K-NEAREST NEIGHBOR QUERY ALGORITHM FOR MOVING OBJECTS WITH A TREE-LIKE INDEX

STATEMENT OF GOVERNMENT SUPPORT

This invention was made with government support under grants #1213026, 1429345, and 1338922 awarded by the National Science Foundation. The government has certain rights in the invention.

BACKGROUND

Contemporary technology allows moving object data to be collected easily and extensively. Applications that deal with moving object data (e.g., traffic monitoring, flight control, and location-based advertisement and recommendation) typically require location-based services (LBS). LBS include querying for the historical, current, or predictive future locations of moving objects and of static objects proximal to moving objects. K nearest neighbor (kNN) queries find interest points nearest to a location. Continuous kNN (CkNN) queries find nearest interest points along an entire trajectory of a moving object.

BRIEF SUMMARY

Embodiments of the subject invention can output a first result of a CkNN query to the user almost instantly and gradually update the response to include a sequential order of distance or time. This progressive approach can reduce computation time when outputting a large result.

Embodiments of the subject invention allow for continuous output and maintenance of the query results while a query point is moving. Using a spatial tree-like index, only one query post or one-time tree traversal is required for all segments in a path.

Embodiments of the subject invention can retrieve the k nearest neighbor interest points to every point on the path of a moving object. The result can be position or time dependent and change when the order of the interest points relative distances to the query point change. CkNN queries can be used for many location-based applications. For example, "If I continue moving in this direction, what will be my closest restaurants for the next 10 minutes?" or "What will be my nearest gas station at any point during my route from city A to city B?"

DETAILED DESCRIPTION

Continuous k Nearest Neighbor (CkNN) query is a technology in the spatial database realm and useful in location-based applications. The progressive continuous k nearest neighbor (PCkNN) query continuously searches for k nearest objects while a query point is moving along a path. For a PCkNN query, each element in the result set can be expressed as the following two-component tuple:

$$\text{result}[i] = <[A,B],(NN1,NN2,\ldots,NNk)>(i=0,1,2,\ldots) \quad (1)$$

Figure 2:
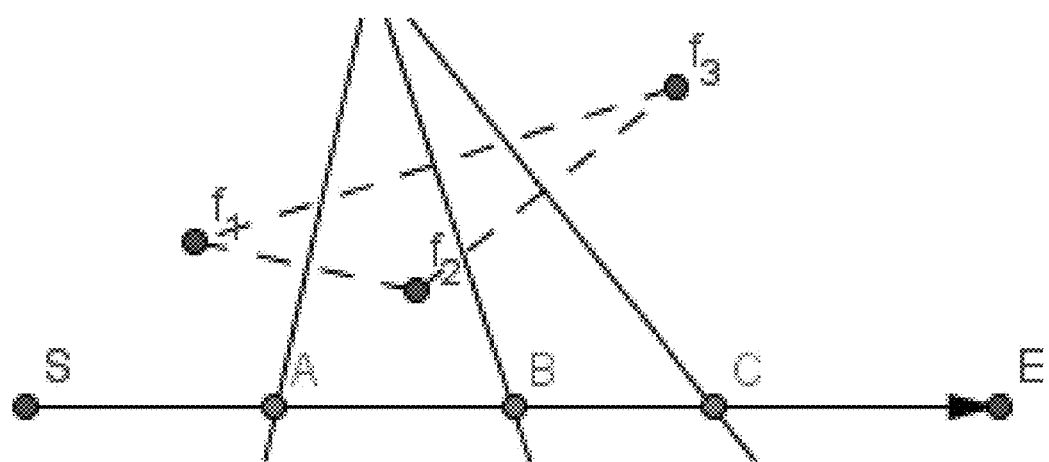
FIG. 2 shows a diagram of the generation of split points using the perpendicular bisectors between interest points with respect to the query trajectory in a Progressive CkNN query.

Points A and B are located in the path segment of the query point. This formula states that for an arbitrary point Q between A and B in the path's segment, its k nearest neighbors are the interest points (NN1, NN2, ... NNk). The interest points are ordered by distance to Q. The sequence (NN1, NN2, ..., NNk) is defined as a kNN-Sequence. As shown in FIG. 2, the result of this PC3NN query is:

$$\text{result} = \{\langle (S, A), (f1, f2, f3)\rangle, \quad (2)$$
$$\langle (A, B), (f2, f1, f3)\rangle,$$
$$\langle (B, C), (f2, f3, f1)\rangle,$$
$$\langle (C, E), (f3, f2, f1)\rangle\}.$$

Note that for any two adjacent kNN-Sequences, e.g., (f1, f2, f3) and (f2, f1, f3), the only difference is either the swapping of two adjacent elements (e.g., f1 and f2), or replacement of the last node with a new point.

In a PCkNN query result, the kNN-Sequence can change with the continuous movement of the query point on query segment SE. Every change of the kNN-Sequence can be the result of the swapping of two or more adjacent elements in the sequence or replacement of the last node with a new point.

Proof (by contradiction): Assume there is a point A on segment SE. The query point Q is moving from S to E. As for segment |SA|, the kNN-Sequence is $$(f1, f2, \ldots, f_i, f(i+1), \ldots, f(j-1), f_j, f(j+1), \ldots, fk). \quad (3)$$

For segment |AE|, the kNN-Sequence is $$(f1, f2, \ldots, f_j, f(i+1), \ldots, f(j-1), f_i, f(j+1), \ldots, fk), \quad (4)$$

in which case the two elements swapped are not adjacent.

It can be inferred that when $|QA| \to 0$ (Q gets close to A) with $|SQ| < |SA|$ (Q is still on segment SA), the kNN-Sequence is (1). When $|QA| \to 0$ with $|SQ| > |SA|$ (Q is on segment AE), the kNN-Sequence is (2). Since the movement of Q is continuous, $\text{dist}(A, f_i)$ must be equal to $\text{dist}(A, f_j)$. According to the definition of kNN-Sequence, $\text{dist}(A, f_i) \leq \text{dist}(A, f(i+1)) \leq \ldots \leq \text{dist}(A, f_j)$. So $\text{dist}(A, f_i)$, $\text{dist}(A, f(i+1))$, ..., $\text{dist}(A, f_j)$ must be equal to each other. That means for any two points chosen from fi, f(i+1), ..., fj, denoted as fu and fv, the perpendicular bisector of segment

|fufv| must pass A. So when Q passes A, the positions of fu and fv in the kNN-Sequence must be reversed, which means any two points from fi, f(i+1), . . . , fj must be reversed. Then the kNN-Sequence should be $$(f1, f2, \ldots, fj, f(j-1), \ldots f(i+1), fi, f(j+1), \ldots fk) \quad (5)$$

instead of $$(f1, f2, \ldots, fj, f(i+1), \ldots f(j-1), fi, f(j+1), \ldots fk). \quad (6)$$

This contradicts the assumption. (end of proof)

Figure 3A:
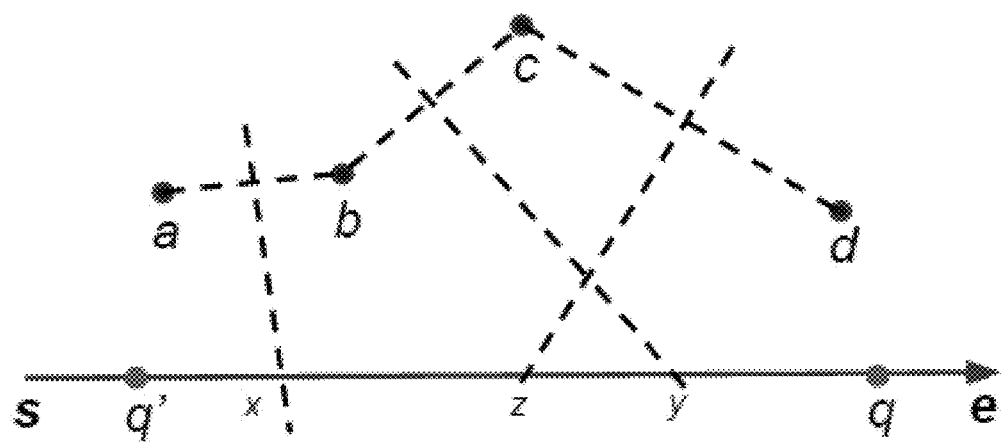
FIG. 3A shows a diagram illustrating swapping adjacent interest point before the query point passes a particular split point in a Progressive CkNN query.
Figure 4:
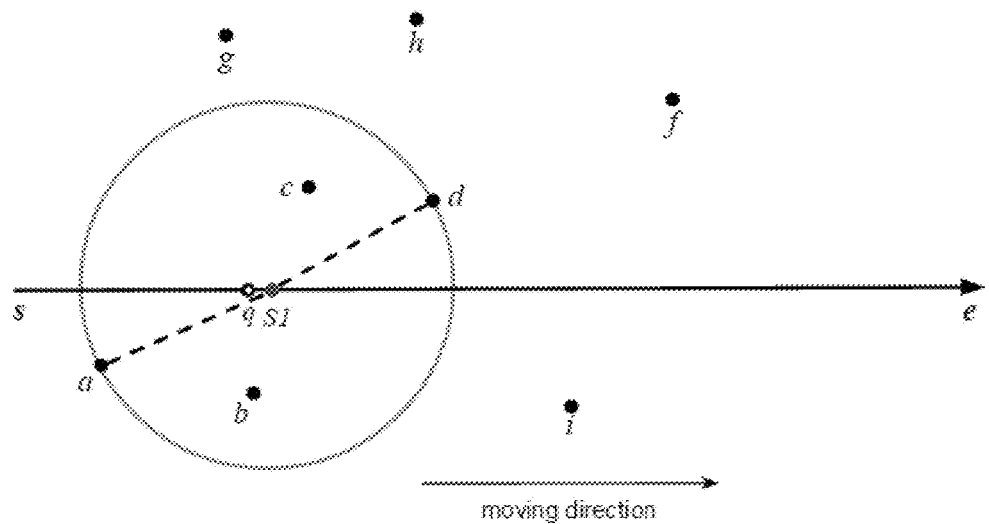
FIG. 4 shows a diagram of a query point before passing a split point in a CkNN query.

FIG. 3A shows an example of the swapping of adjacent interest points. Given a query segment |se|, four interest points (a, b, c, d) and query point locations (q', q) while the query point moves from left to right on |se|, the sequence of distances between the query point and interest points can be observed. The sequence of distances from each interest point in relation to q' is (a, b, c, d). Comparatively, q's sequence of interest points is d, c, b, a. The only split points that need to be generated initially (at q') are the ones that result from adjacent interest points, that is why only |ab|, |bc|, and |cd| are connected. FIG. 4 is a diagram of a query point q before passing a split point in a CkNN query. Every change to the kNN-Sequence can be the result of swapping of two or more adjacent elements in the sequence. These split points are swap split points, (i.e., the points on the query trajectory at which the order of two adjacent interest points is swapped). Once adjacent elements are swapped, new split points can be generated in accordance to the newly adjacent elements in the sequence; whereby split points can be generated as the query point moves along |se|.

Figure 3B:
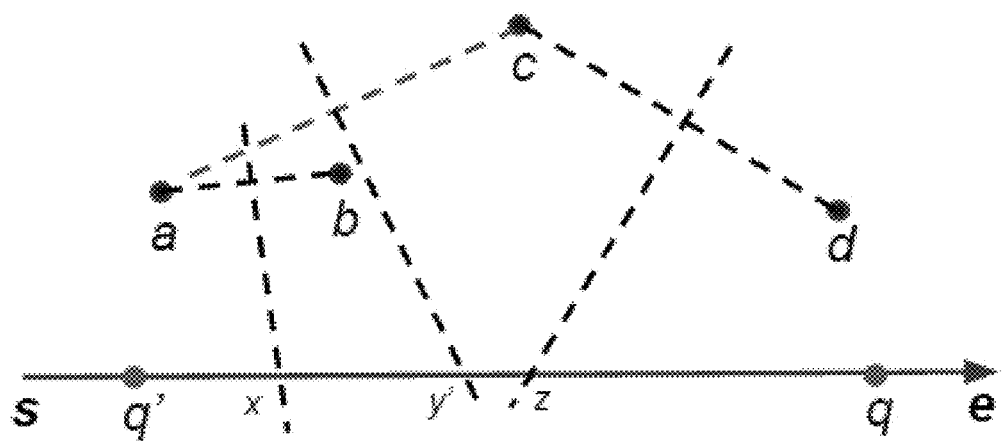
FIG. 3B shows an illustrative diagram of adjacent interest point swapping after the query point passes a particular split point in a Progressive CkNN query.

As seen FIG. 3B, q moves to split point x, which results in a and b being swapped. The new sequence of interest points is now b, a, c, d. Since previously non-adjacent elements (e.g., a and c) are now adjacent and previously adjacent elements are now non-adjacent (e.g., b and c), |bc| is disconnected and |ac| is connected. Split point y is removed and a new split point y' is generated between the newly adjacent elements (e.g., a and c). Repeating these steps on the query interval |se| will output the split points and CkNN progressively.

Figure 5:
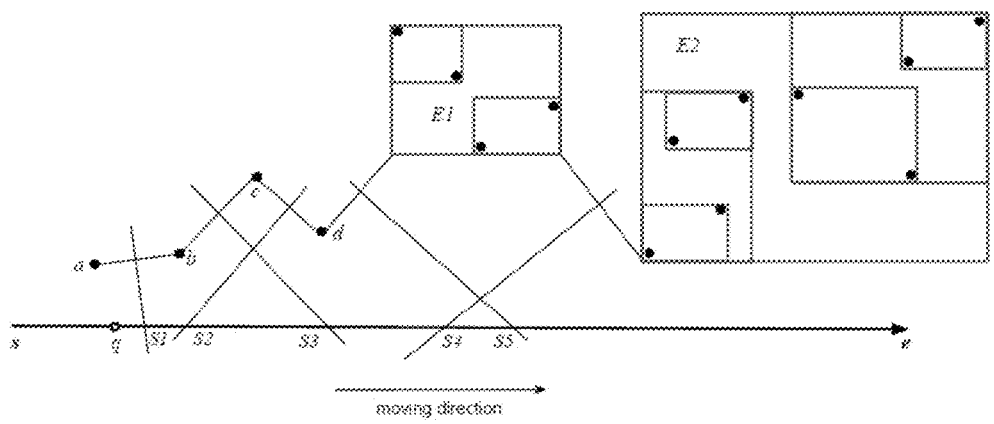
FIG. 5 shows a diagram illustrating the split points generated by interest points and minimum bounding rectangles (MBRs).

FIG. 5 illustrates the principles of certain embodiments. There can be an Entry-List that comprises a set of elements {a, b, c, d, E1, E2} and a heap of split-points that comprises {S1, S2, S3, S4, S5}. The approach of generating and storing split points strictly for adjacent elements in Entry-List yields a significantly reduced number of elements in memory compared to non-indexed approaches that generate split points for every pair of non-adjacent elements as well. This approach is efficient if k is large because the herein disclosed method is not sensitive to the size of k and can progressively output the result set.

Figure 6A:
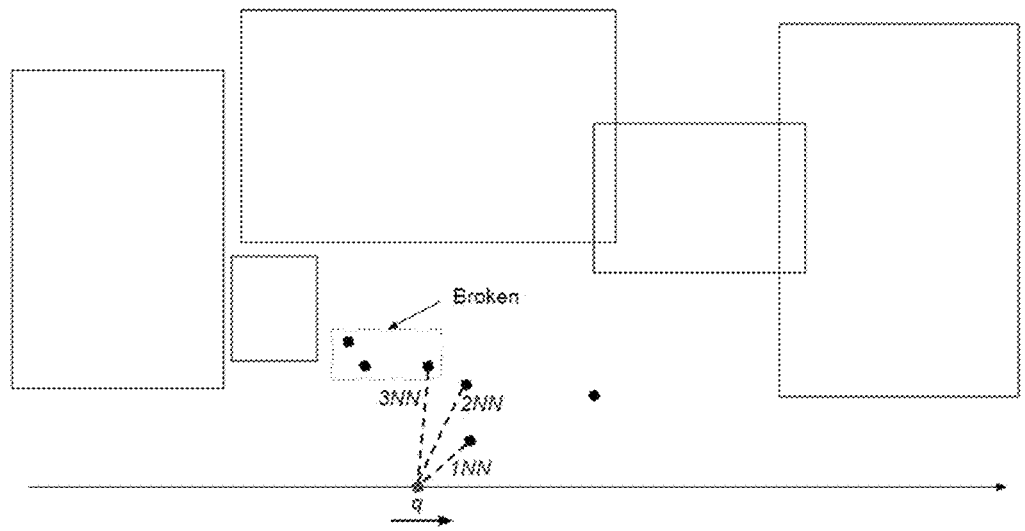
FIG. 6A shows a diagram illustrating the expansion of an MBR.
Figure 6B:
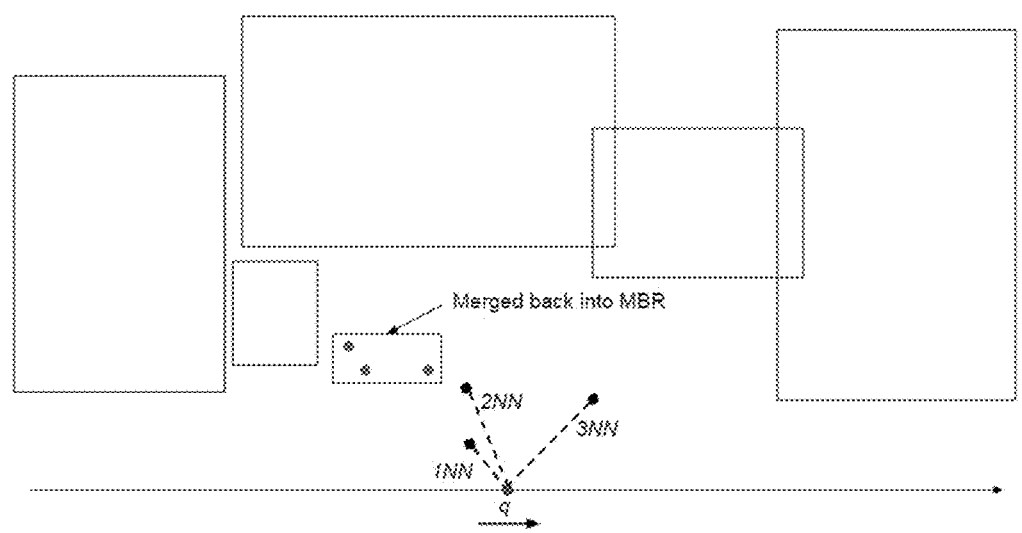
FIG. 6B shows a diagram illustrating the merging of points back into an MBR.

Embodiments of the subject invention can "merge" children nodes into their parent node when they are not included in the kNN or they do not have a recursive child in the current kNN (i.e., a process referred to as collapsing). A parent node can replace its children nodes in memory, effectively reducing memory usage by a factor of the tree-like index's fan-out. Collapsing only occurs immediately after a leaf node is swapped out from the kNN. The collapsing can render certain embodiments capable of handling not only trajectories that comprise line segments but also many other patterns that may consist of curves, loops, etc. As seen in FIG. 6A, the node that contains the 3rd nearest neighbor in the result set is expanded. FIG. 6B shows that as the query point moves forward, all the points belonging to the node are no longer shown in the query result. The points are then safely collapsed back into the original minimal bounding rectangle (MBR). With collapsing, the memory usage can be tightly bounded, no matter how the trajectory of the query point changes over time.

Embodiments of the subject invention can find a sequence of data points, include points which appear in the result of the query, and continuously maintain that sequence.

Embodiments of the subject invention can progressively output results. This can be more favorable when the query is expensive to execute or the result set is large. Certain embodiments use minimal resources of CPU, IO, and memory. This can be beneficial for applications on servers handling large amounts of queries, (e.g., large-scale online LBS map services), and applications on devices with limited CPU and memory, (e.g., GPS navigation devices with embedded systems). Certain embodiments only need to post one query for all segments in a path; can track and output CkNN results when the order of kNN changes; and are not restricted to query trajectories that consist of only line segments (i.e. capable of handling multiple query trajectories that consist of curves, loops, etc.).

Embodiments of the subject invention provide for a continuous k nearest neighbor query that outputs query results in a continuous and progressive manner. Given a query point q moving along some path g, a set of interest points I, and a constant k, a subset of I (or less if data set size is less than k), in which the points are top k closest distance to q, is continually returned as part of any tuple in result set R.

Path g can be any set of points, in which each point can be a tuple of coordinates. g can be the trajectory of query point q represented as a geometric shape, which may be, but is not limited to be, a line segment, a polyline, or a curve.

A query point or moving object q can travel along path g; the point is a tuple of coordinates at any given time and can represent an object in physical or virtual multidimensional space, (e.g., a person, an animal, a car, a plane, a smartphone, or a drone). This can apply to every point p in I, although the points in I are not all necessarily represented by the same object type. It is possible for every point p in I to have different object types. Every interest point p in I can be a stationary object, (e.g., a gas station, a police station, a restaurant, hotel, or an objective in a videogame).

Constant k can be the maximum number of interest points returned as part of any tuple in result set R. However, the size may be less than k if the data set size is less than k. PCkNN result set R is a set of tuples wherein each tuple contains a split point along with a collection of k interest points ordered by their distance to q. An example is R={<s1, {p23, p50, p11, p9}>, <s2, {p23, p50, p11, p9}>, <s3, {p50, p23, p11, p9}>}. When query point q passes split point s1, interest point p23 is the 1NN, p50 is the 2NN, and so on. R is updated and the change in R is progressively returned as q travels along g.

Figure 1A:
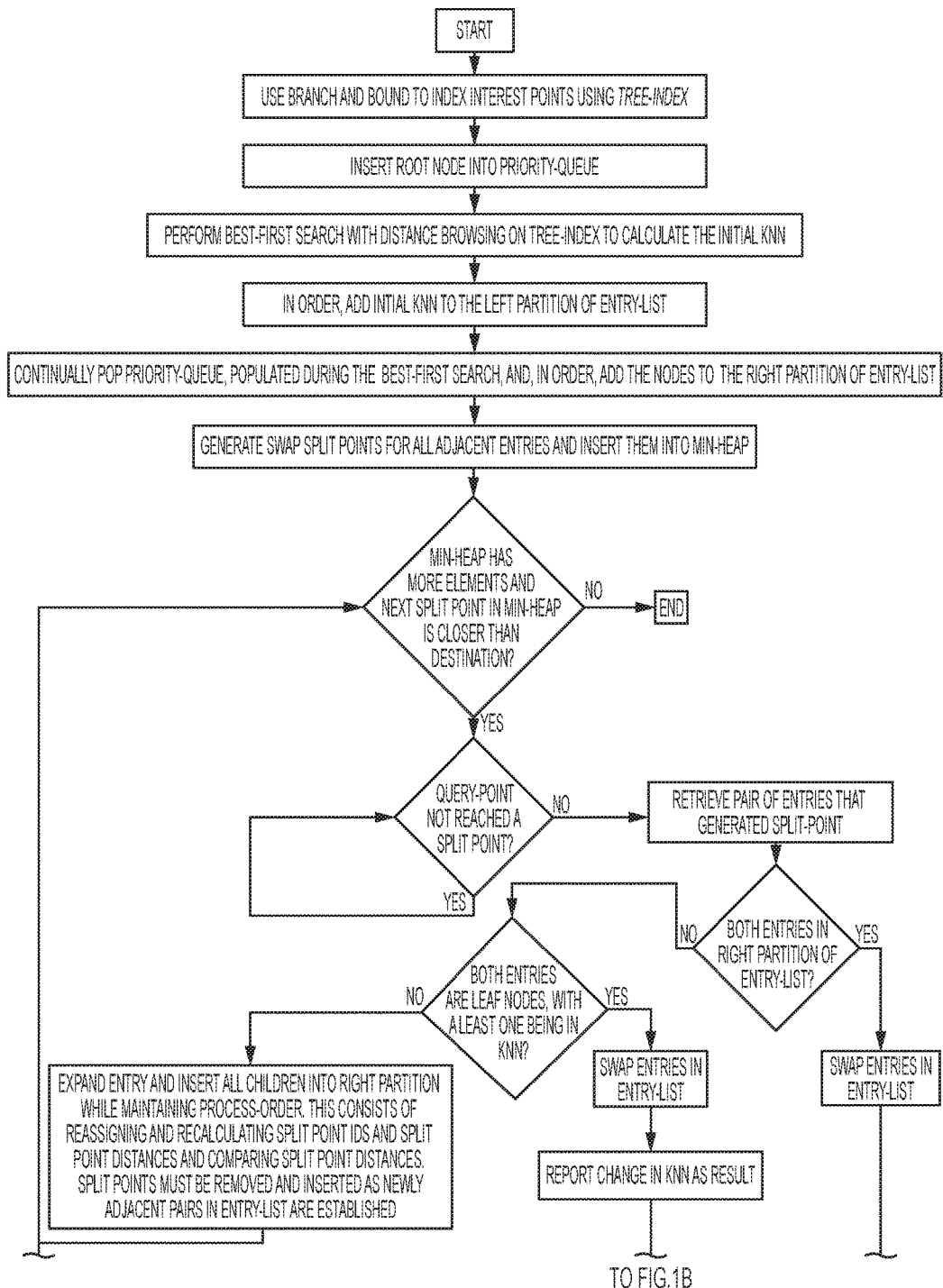
FIGS. 1A and 1B show a diagram of workflow of a Progressive CkNN query execution that utilizes a tree-like index according to certain embodiments.
Figure 1B:
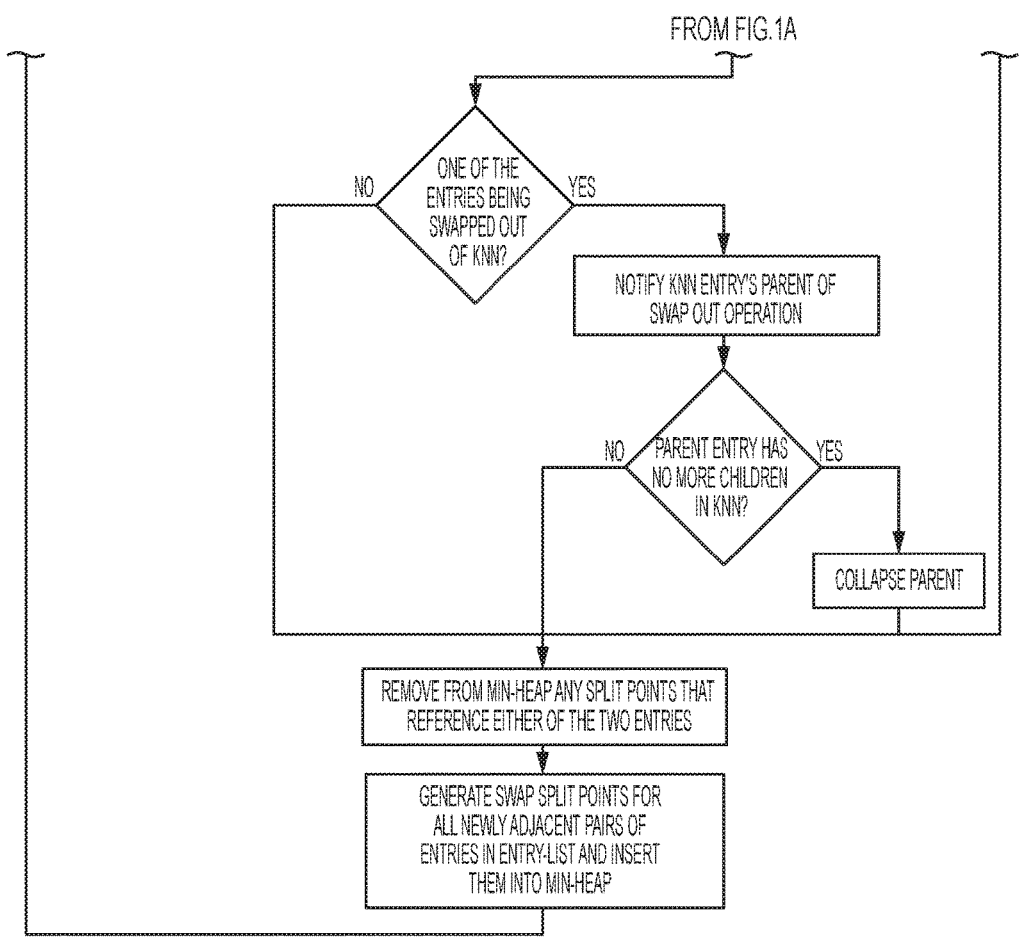

FIGS. 1A and 1B show a diagram of workflow of a Progressive CkNN query execution that utilizes a tree-like index according to certain embodiments.

In the following steps, the tree-like index is assumed to be an R-tree to remove the ambiguity between a "tree node" and a "linked list node" (and to eliminate the verbosity of "linked list node"); however, it is important to note that the herein disclosed method is not restricted to the utilization R-trees as the tree-like index. The terms "root node", "internal node", and "leaf node" are used when referring to nodes in the R-tree.

A first step can be to use a branch-and-bound algorithm to index a set of interest points with a spatial tree-like index, (e.g., R-tree). By using a tree-like index, the approach of the present invention can reduce the number of points that are stored in memory (or on-disk) by bounding and grouping interest points that are farther from the query point into MBRs which increases performance.

A second step can be to calculate the initial kNN and initialize the Process-Partition (as defined below). The tree-like index is traversed, utilizing a search, algorithm (e.g., a best-first search heuristic), to continually expand nodes until the k nearest interest points of the query point are found. A best-first search is a search algorithm, such that the most promising nodes in a graph are selected for traversal according to a search heuristic. Finding the closest object to a query point is called distance browsing. A distance browsing approach can be utilized as a part of a best-first search to find the most promising node, (i.e., the node that is closest to the query point).

A subset of interest points and MBRs in the index are maintained in a linked list of entries (leaf and internal nodes in the index), hereinafter referred to as the Entry-List that is partitioned into two regions: a left partition, hereinafter referred to as the kNN-Partition, and a right partition, hereinafter referred to as the Process-Partition. A linked list can be a linear data structure, such that each element is a node that contains data and a pointer or reference to the next node. Each entry in the Entry-List can contain additional states, hereinafter referred to as spDist and spID. The state spDist can be the distance between the entry and a given split point, which is then used to maintain the Process-Partition. The state spID is a split point identification number used to determine for which split point spDist was calculated. Each swap split point can have a unique identification number. Every entry at this step has an spID initialized to some invalid value as spDist is not calculated initially.

The kNN-Partition can comprise the current kNN, in which all elements can be strictly leaf nodes in the index (i.e., interest points) and are maintained in the order of distance. That is, the k-th element in the left partition is the k+1-th nearest neighbor, assuming the $0^{th}$ element is the 1NN.

The Process-Partition comprises both leaf nodes and internal nodes, which can be maintained in the process-order. That is, any entry i that is before any entry j in Process-Partition is processed first.

When the kNN-Partition is in distance-order and the Process-Partition is in process-order, the Entry-List can be considered sorted. The Entry-List can be continually kept in a sorted order throughout the execution of the algorithm.

The root node can be inserted into a priority queue to initialize the best-first search. As the search algorithm is executed, any leaf nodes that are at the top of the priority queue can be removed and inserted in order into the kNN-Partition. The search algorithm can conclude when k leaf nodes have been inserted into the kNN-Partition. The remaining elements in the priority queue are popped and inserted (in order) into the Process-Partition. At this point, the Entry-List can be considered sorted.

A third step can be to generate swap split points and maintain results. Split points can be generated by connecting all adjacent entries from the sorted Entry-List and stored into a heap (e.g. a min-heap) of split points, hereinafter referred to as S-Heap. It is unnecessary to have a mapping between each split point and the pair of entries that correspond to the split point. This is because if a split point references the first of the pair, the second can be easily retrieved by accessing the first's next node in the Entry-List.

A fourth step can be to continually maintain the Entry-List and report kNN progressively. When the query point q encounters or reaches a split point, (i.e., the distance between query point q and the top of the S-Heap is less than or equal to a specified threshold), three possible cases can be the following:

First, a split point was generated by any two entries in the Process-Partition. In this case, a swap operation can be performed on the two entries in the list.

Second, a split point was generated by two leaf nodes, with at least one being in the kNN-Partition. In this instance, the following algorithmic steps can occur: (1) the two entries are swapped, (2) the change in the kNN-Partition is reported as a result, and (3) if one of the leaf nodes is swapped out of the kNN-Partition, it notifies the parent entry that it has been swapped out. If the parent entry has no children in the kNN-Partition, its children are collapsed, (i.e., the children entries are removed from the Process-Partition). Parent entries can have pointers or references to their children that reside in the Entry-List. The collapse can be a recursive operation. That is, the parent entry and its siblings can be collapsed into its parent (the grandparent) if the parent entry and its siblings have no recursive children in the kNN-Partition; this is repeated recursively for the grandparent, its parent, and so on. Split points that involve (point to or reference) any of these removed children are removed from the S-Heap. The swap split points must be generated for all newly adjacent pairs of entries in the Entry-List.

Third, a split point was generated by a leaf node in the kNN-Partition and an internal node in the Process-Partition. This instance does not result in a swap operation and the following algorithmic steps can occur: (1) Removing the internal node entry from Entry-List; (2) computing the internal node's children nodes distance to the query point; (3) starting from and right after the internal node's original position in the Entry-List, inserting all internal node's children nodes into the Entry-List one by one, maintaining the entry order in Entry-List by re-computing and comparing each internal node's children's distance (to the new query point) with the existing entry nodes' distance (to the new query point) in the Entry-List one by one.

For each internal node's child node c, inserting c right before the entry node (if any), whose distance (to the reference point) is greater than or equal to c's distance (to the new query point) and right after the entry node, whose distance (to the query point) is less than c's distance (to the new reference point); if c's distance (to the new reference point) is greater than all the exiting entry nodes' distance (to the new query point) then insert c at the tail of the Entry-List.

With the exception of the third case, in both the first and second case, split points from S-Heap that involve any of the two swapped entries can be removed and discarded. Subsequently, generate the swap split points for each newly adjacent pair of points in the Entry-List and insert them into the S-Heap. These actions will be continually performed when q reaches a split point until the S-Heap is empty or the next split point in the S-Heap is farther than the endpoint of the specified trajectory with respect to q. When this termination condition is reached, the PCkNN ends.

Given two entries $E_i$ and $E_{i+1}$ that were retrieved before a swap operation and after the query point encounters the next split point in S-Heap, the set of newly adjacent pairs is defined as:

$$\{\langle E_{i-1}, E_{i+1}\rangle, \langle E_{i+1}, E_i\rangle, \langle E_i, E_{i+2}\rangle\} \quad \text{if } 1 \le i \le n-3 \qquad (7)$$

-continued

| | |
|---|---|
| $\{\langle E_{i-1}, E_{i+1}\rangle, \langle E_{i+1}, E_i\rangle\}$ | otherwise if $1 \leq i \leq n-2$ |
| $\{\langle E_{i+1}, E_i\rangle, \langle E_i, E_{i+2}\rangle\}$ | otherwise if $0 \leq i \leq n-3$ |
| $\{\langle E_{i+1}, E_i\rangle\}$ | otherwise if $0 \leq i \leq n-2$ | where n is the number of elements in the IP-List.

Figure 7A:
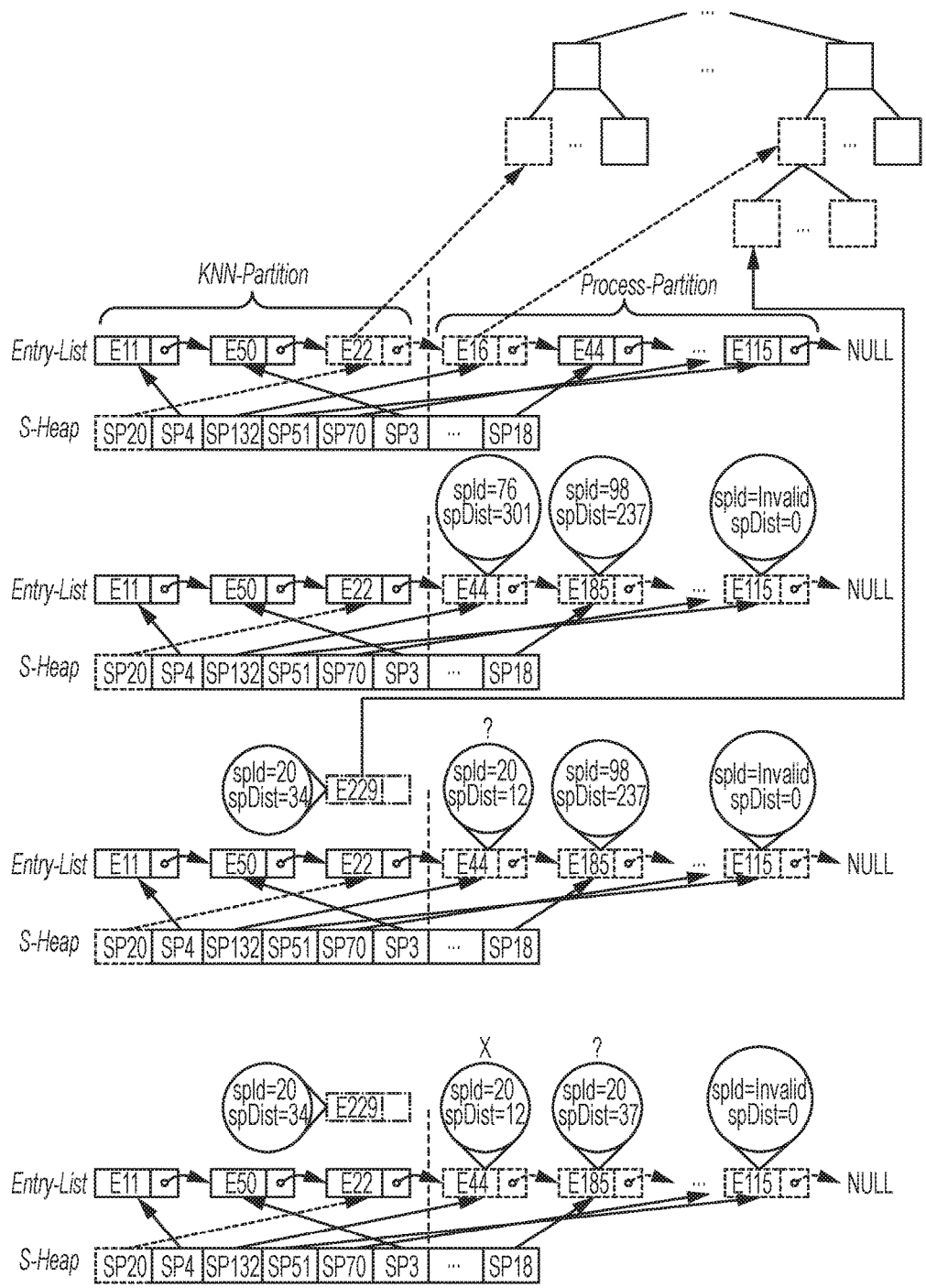
FIGS. 7A and 7B illustrates one case of swapping of a leaf node and an internal node in a Progressive CkNN query.
Figure 7B:
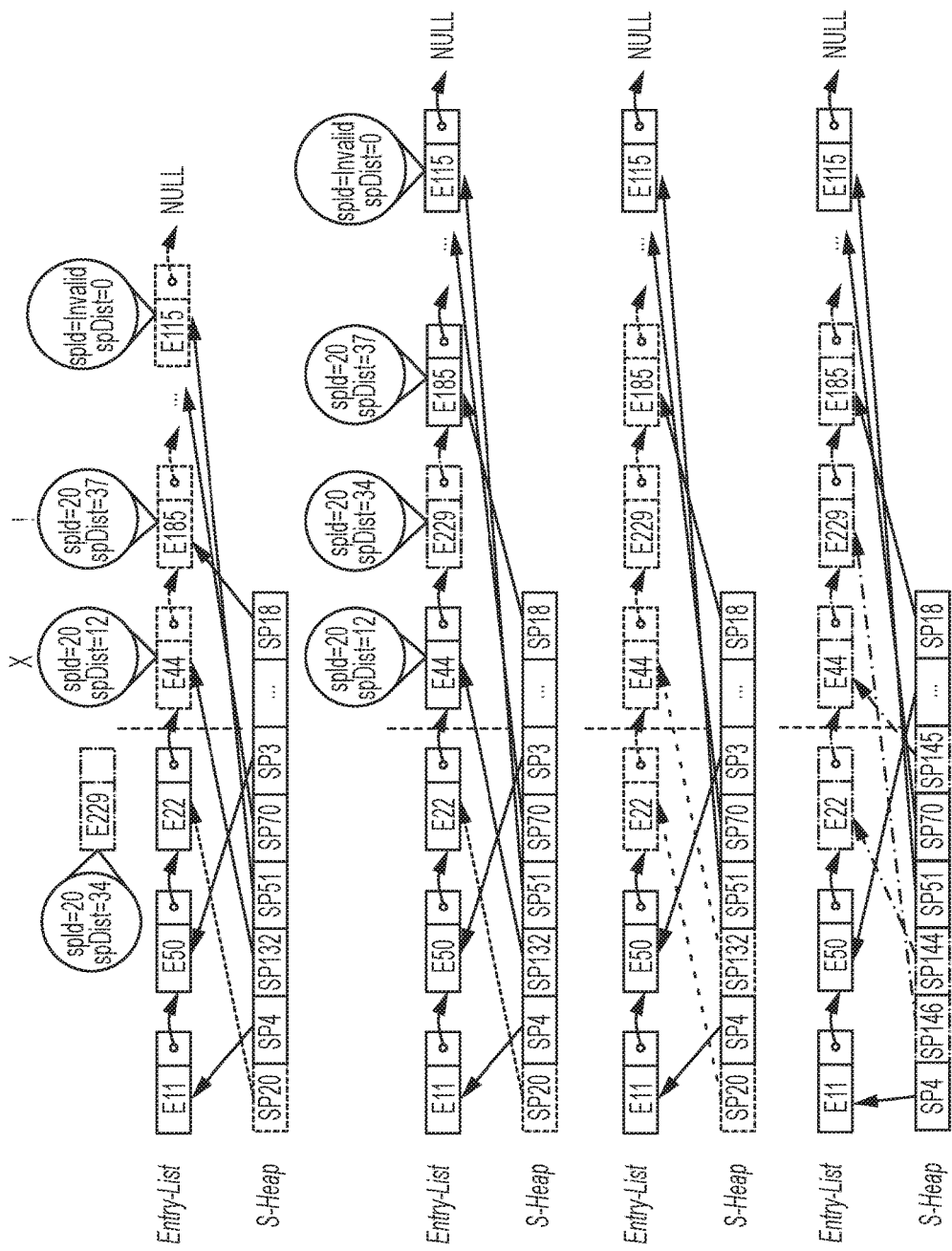

A partial example of an instance where a split point was generated by a leaf node in the kNN-Partition and an internal node in the Process-Partition for a PC3NN query can be seen in FIGS. 7A and 7B. When the query point reaches split point SP20, the two entries that generated it E22 and E16 are retrieved. Since E22 is a leaf node in the kNN-Partition and E16 is an internal node in Process-Partition, the two entries do not swap. Instead, E16 is removed from the list and expanded and a new entry E229 is generated for one of its children. E229's spID is set to 20. The minimum distance between E229 and SP20 is calculated and stored into E229's spDist. Starting from the head of Process-Partition, E44's spID is compared to that of E229. Since they are not the same, E44's spID is set to 20 and its spDist is set to 12. E229's spDist is compared to that of E44. Since E229's 34 is greater than E44's 12, E229 must be inserted somewhere after E44. The next node E185 in Process-Partition is retrieved, and a similar process is performed. E229's spDist of 34 is less than E185's spDist of 37, so E229 is inserted immediately before E185. spIDs and spDists do not need to be reset or recalculated for subsequent nodes in the list unless E16 has another child that needs to be inserted after E185. Split points sp20 and sp132 are now invalid because of the removal of E16 and the insertion of E229, so they must be removed from S-Heap. Three split points sp144-sp146 are generated because of the newly adjacent pairs of entries: {<E22, E44>, <E44, E229>, <E229, E185>}. This example only shows the insertion of one of E16's children. The insertion process for subsequent children can be the same.

In an embodiment of the subject invention, a method for performing a continuous k-nearest neighbors (kNN) query in location based services for moving objects, which outputs ordered query results in a continuous and progressive manner, comprises detecting a moving object and a trajectory of the moving object; receiving a kNN query (q), which for a given reference point, a given integer k, would output k interest points that are nearest to the reference point. A continuous version of a query with respect to same trajectory, comprises the query being potentially evaluated at any time as referencing the location of the moving object. In other words, for any time t, q(t) would result in a set of k interest points from a universe of interest points that are nearest to the location of the moving object at a time t; a querying device posing the continuous query.

In an embodiment of the subject invention, a query computing device comprises a computer readable medium storing and indexing interest points by using a spatial tree-like index and storing instructions that when executed (e.g., by a processor) evaluates the continuous query and determines the split point of the trajectory (defined recursively as: the first point of the trajectory and all subsequent points of the trajectory where the ordered list of the k nearest interest points differs from that list for the previous split point on the trajectory) by performing the following steps:

A first step can be to receive the continuous kNN query from the querying device. A next step can be initially, to let the reference point be the beginning of the trajectory. A next step can be to use an incremental nearest neighbor algorithm to compute the k nearest interest points to the reference point and maintain using the algorithm a distance-priority queue comprised of nodes referencing interest points and a hierarchy of minimal bounding rectangles partitioning the space of interest points with respect to the query point. A next step can be to build a list (hereinafter referred to as Candidate-Output-List) to store all the nodes (including leaf nodes and internal nodes), where all nodes in the list are ordered by their distance to the reference point. The Candidate-Output-List comprises two partitions, the first partition contains initially the k nearest points (leaf nodes), and the second partition contains the nodes of the priority queue.

A next step can be to initialize a min-heap data structure (hereinafter referred to as Candidate-Split-Point-Heap) to initially contain candidate split points, computed as follows: For each node and its subsequent node (hereinafter referred to as adjacent node pair) in the Candidate-Output-List, perform the following procedure (hereinafter referred to as Split-Point-Generation operation), comprising: (1) given two nodes, compute the position of points in the trajectory to which the distances from the given two nodes are equal; add the nearest point to the reference point to the Candidate-Split-Point-Heap; and (2) maintain the contents of Candidate-Split-Point-Heap ordered by their distance to the reference point and linking each point in the Candidate-Split-Point-Heap to the two nodes in Candidate-Output-List from which the Candidate-Split-Point-Heap point was computed.

A next step can be to iteratively, perform the following steps until a termination condition is reached: (1) move the reference point to the candidate split point that is popped from the Candidate-Split-Point-Heap (the reference point is the hypothetical position of the moving object); and (2) conduct a swapping operation, comprising: retrieving from the Candidate-Output-List, the two adjacent nodes (n1, n2) linked from the Candidate-Split-Point-Heap point (i.e. (n1, n2) are the two nodes from which the Candidate-Split-Point-Heap point was computed.)

If both (n1, n2) from the previous step are in the second partition of the Candidate-Output-List, then swap the two nodes (n1, n2), into (n2, n1), whereby the Candidate-Output-List will still be ordered by the distance to the new reference point.

Alternatively, if n1 and n2 from the previous step are both leaf nodes and n1 is in the first partition of the Candidate-Output-List, perform the following steps:

First, swap the two nodes (n1, n2) into (n2, n1). If prior to the swap n2 was in the second partition of the Candidate-Output-List, then n1 is swapped out the first partition and is swapped into the second partition; perform a recursive parent collapsing procedure for all of n1's ancestor nodes from n1's parent through the root node (including n1's parent p', p's parent node p'', p'''s parent p''', . . . until the root node), wherein the parent collapsing procedure is defined as: for a given node p, if none of leaf nodes' entry of node p's sub-branch tree is in the first partition, then all nodes' entity of p's sub-branch tree that are stored in the second partition are removed from Second-Partition; add p into Candidate-Output-List. Second, produce an output by delivering the content of the first partition of the current Candidate-Output-List (which may include additional information, such as the candidate split point as the final output split point, where the reference point was moved to).

In an embodiment, the querying device is the same device as the query-computing device.

In an embodiment, the computing of the position of the points in the trajectory to which the distance from the given two nodes are equal, is implemented by solving the equal distance equation, the two sides of which are continuous distance functions that present the continuous distance changing of a node to the reference point when the reference point is moving along the trajectory.

In an embodiment, the continuous distance functions that present the continuous distance changing of a node to the reference point when the reference point is moving along the trajectory, is simplified by using the distance from reference point to the circumscribed circle of the minimum bounding rectangle (MBR) of the node instead of the original MBR of the node, to avoid the complexity of piecewise distance function computing for the MBR.

In an embodiment, maintaining the linking between each candidate split point in Candidate-Split-Point-Heap and the corresponding two nodes entries in Candidate-Output-List that have generated the split point is achieved by using reference pointers in the memory of a computer readable medium.

In an embodiment, the termination condition is one of the following situations: the reference point becomes a split point or a specified point in the trajectory path, or the Candidate-Split-Point-Heap is empty.

Algorithms have been disclosed in the foregoing for the effective resolution of continuous k nearest neighbor queries and that return results in a progressive fashion (i.e. predictive, real time, or historical). While exemplary embodiments and examples are presented, they do not limit the scope of the invention and its use cases but serve as illustrations of use cases. That is to say that neither a GPS, database, smartphone, smartphone application, nor any of the technologies in the exemplary embodiments need to be used in the deployment of embodiments of the present invention. Certain embodiments can be implemented locally, remotely, on an internet-enabled or non-Internet-enabled personal computer (PC), server, smartphone, any device or equipment, or any combination of the above, all possibly interconnected via a wired or wireless network.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A user driving in a vehicle with a Global Positioning System (GPS) application installed on an internet-enabled smartphone may inquire about the closest hotels on an 18-hour trip. As the user is driving, the user would like to know, the closest 10 hotels at any point along his planned route. Using the Sam's current geographical location, Sam's driving route, the service determines the 10 closest hotels while 9 hours far into the trip. The hotel names and locations are returned to the user's GPS app, ordered by their distance to the user's current location.

Example 2

A user decides to get off the next exit on a highway to rest. The application indicates that that hotel H is currently closest to him, but also that hotel E will be closest after exiting the highway. This information is shown within the app easily and quickly because of the present invention's capability of efficient progressive re-computation of queries without reposting them. He informs the app that he would like to change his destination to hotel E. He keeps driving along the same route and decides to get off the aforementioned exit to reach hotel E.

Example 3

After exiting a highway, the user sees a sign of a restaurant chain, but 5 miles in the opposite direction of travel. The user performs a U-turn and heads to the restaurant. At this point, the application indicates that there has been a change as the users has departed from the original driving route. Although the route has changed, the user still remains on the same path, so the service does not need to regenerate the swap points as they remain the same. Hotel E still remains the closest hotel.

Example 4

In a particular embodiment, a system or method can predict the 5 nearest gas stations during a drive along a path between two locations.

Example 5

In a particular embodiment, a system or method can report and update in real time the nearest pizzerias during a walk between two locations.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A system for performing a continuous k-nearest neighbor (CkNN) query in location based services for moving objects, the system comprising:
a computer readable medium comprising instructions that when executed causes at least one processor to:
receive a k-nearest neighbor query from a mobile device;
continuously receive a location and trajectory of the mobile device, an initial location of the mobile device being a reference point, the position of the reference point matching the position the mobile device along the trajectory;
access a database containing a plurality of interest points surrounding the location and trajectory of the mobile device;
store and index, in computer memory, the plurality of interest points in a spatial tree index;
construct a first list to store all nodes of the spatial tree index, each node being ordered by its distance to the current location of the reference point, the list comprising a first partition containing the k-nearest interest points and a second partition containing each node that references the k-nearest interest points;
initialize a first min-heap to initially contain split points, computed as follows:
for each node n1 and its subsequent adjacent node n2 in the first list, perform the following procedure, comprising:
given the node n1 and its subsequent adjacent node n2, detect a split point in the mobile device's trajectory, a split point being a point whose position has equal distances from the two nodes n1, n2 respectively;
add the split point nearest to the current position of the reference point to the first heap; and
continuously maintain the split points in the first heap as ordered by their distance to the current location of the reference point and link each split point to the two nodes n1, n2 in first list from which each split point was computed;
continuously query the index to compute k-nearest interest points nearest to the mobile device;
continuously maintain a queue comprising nodes referencing the k-nearest interest points and a hierarchy of minimal bounding rectangles; and
continuously return to the moving device, the k-nearest interest points.

2. The system of claim 1, the computer readable medium that when executed further causes the at least one processor to:
iteratively perform the following steps until a termination condition is reached:
move the location of the reference point to a split point that is contained in the first heap;
in the first list, retrieve the node n1 and subsequent adjacent node n2 linked to the split point that is contained in the first heap,
the node n1 and the subsequent adjacent node n2 being both in the second partition;
swap the order of the node n1 and the subsequent adjacent node n2;
remove from the first min-heap any split points that are linked to nodes that were swapped; and
generate new splits points.

3. The system of claim 2, the termination condition comprising one of the following: the reference point becomes a split point or a specified point in the trajectory path, or the first min-heap is empty.

4. The system of claim 1, the computer readable medium that when executed further causes the at least one processor to:
iteratively perform the following steps until a termination condition is reached:
move the location of the reference point to a split point that is contained in the first heap;
in the first list, retrieve the node n1 and subsequent adjacent node n2 linked to the split point that is contained in the first heap,
the node n1 and the subsequent adjacent node n2 both being leaf nodes and the node n1 is in the first partition;
swap the order of the node n1 and the subsequent adjacent node n2;
remove from the first min-heap any split points that are linked to nodes that were swapped; and
generate new splits points.

5. The system of claim 4, the computer readable medium that when executed further causes the at least one processor to:
prior to the swap, the subsequent adjacent node n2 being contained in the second partition;
remove the node n1 from the first partition and place the node n1 into the second partition;
recursively collapse for all parent nodes of the node n1 by the following procedure:
for a given node p, if no leaf nodes of node p's sub-branch tree are in the first partition, then all nodes of p's sub-branch tree that are stored in the second partition are removed from second partition;
add p to the first list; and
output the first partition.

6. The system of claim 4, the termination condition comprising one of the following: the reference point becomes a split point or a specified point in the trajectory path, or the first min-heap is empty.

7. The system of claim 1, the computer readable medium that when executed further causes the at least one processor to:
iteratively perform the following steps until a termination condition is reached:
move the location of the reference point to a split point that is contained in the first heap;
in the first list, retrieve the node n1 and subsequent adjacent node n2 linked to the split point that is contained in the first heap;
the node n1 being a leaf node in the first partition and the subsequent adjacent node n2 being an internal node in the second partition;
remove the subsequent adjacent node n2 from the first list;
compute each distance of each child node of the subsequent adjacent node n2 from the current location of the reference point;
insert all child nodes of the subsequent adjacent node n2 into the first list, insertion beginning after the original position of the subsequent adjacent node n2; and continuously maintaining the order in the first list by re-computing and comparing each child nodes' distance to the current location of the reference point and a current entry node's distance to the current location of the reference point, each child node being inserted into the first list before an entry node whose distance to the original location of the reference point is greater than or equal to respective child node's distance to the current location of the reference point, each child node being inserted into the first list after the entry node whose distance to the original location of the reference point is less than the respective child node's distance to the current location of the reference point, and any child node whose distance to the current location of the reference point is greater than each of the existing entry node's distances to the current location of the reference point being inserted into the end of the first list.

8. The system of claim 1, the mobile device comprising the computer readable medium.

9. The system of claim 1, the computer readable medium that when executed further causes the at least one processor to:

compute the position of the node n1 and subsequent adjacent node n2 by solving an equal distance equation, the two sides of the equation being continuous distance functions that present the current distance between each node and the current location of the reference point.

10. The system of claim 1, the computer readable medium that when executed further causes the at least one processor to:

compute the position of the node n1 and subsequent adjacent node n2 by solving an equal distance equation, the two sides of the equation being continuous distance functions using the distance from reference point to the circumscribed circle of a minimum bounding rectangle of each node instead of the original minimum bounding rectangle of each node, to avoid the complexity of piecewise distance function computing for the minimum bounding rectangle.

11. The system of claim 1, the computer readable medium that when executed further causes the at least one processor to:

link each point in the first heap to the two nodes in first list from which each split point was computed by using reference pointers in the memory of a computer readable medium.

12. A method for performing a continuous k-nearest neighbor (CkNN) query in location based services for moving objects, the method comprising:

provide a computer readable medium comprising instructions that when executed causes at least one processor to:

receive a k-nearest neighbor query from a mobile device;

continuously receive a location and trajectory of the mobile device, an initial location of the mobile device being a reference point, the position of the reference point matching the position the mobile device along the trajectory;

access a database containing a plurality of interest points surrounding the location and trajectory of the mobile device;

store and index, in computer memory, the plurality of interest points in a spatial tree index;

continuously query the index to compute k-nearest interest points nearest to the reference point;

continuously maintain a queue comprising nodes referencing the k-nearest interest points and a hierarchy of minimal bounding rectangles;

construct a first list to store all nodes of the spatial tree index, each node being ordered by its distance to the current location of the reference point, the list comprising a first partition containing the k-nearest interest points and a second partition containing each node of the queue;

initialize a first min-heap to initially contain split points, computed as follows:

for each node n1 and its subsequent adjacent node n2 in the first list, perform the following procedure, comprising:

given the node n1 and its subsequent adjacent node n2, detect a split point in the mobile device's trajectory, a split point being a point whose position has equal distances from the two nodes respectively;

add the split point nearest to the current position of the reference point to the first heap; and continuously maintain the split points in the first heap as ordered by their distance to the current location of the reference point and link each split point to each pair of two nodes in first list from which each split point was computed; and continuously return to the mobile device, the k-nearest interest points.

13. The method of claim 12, further comprising:
iteratively perform the following steps until a termination condition is reached:

move the location of the reference point to a split point that is contained in the first heap;

in the first list, retrieve the node n1 and subsequent adjacent node n2 linked to the split point that is contained in the first heap, the node n1 and the subsequent adjacent node n2 being both in the second partition;

swap the order of the node n1 and the subsequent adjacent node n2;

remove from the first min-heap any split points that are linked to nodes that were swapped; and generate new splits points.

14. The method of claim 13, further comprising:
prior to the swap, the subsequent adjacent node n2 being contained in the second partition;

remove the node n1 from the first partition and place the node n1 into the second partition;

recursively collapse for all parent nodes of the node by the following procedure:

for a given node p, if no leaf nodes of node p's sub-branch tree are in the first partition, then all nodes of p's sub-branch tree that are stored in the second partition are removed from second partition;

add p to the first list; and output the first partition.

15. The method of claim 12, further comprising:
iteratively, perform the following steps until a termination condition is reached:

move the location of the reference point to a split point that is contained in the first heap;

in the first list, retrieve the node n1 and subsequent adjacent node n2 linked to the split point that is contained in the first heap, the node n1 and the subsequent adjacent node both being leaf nodes and the node is in the first partition;

swap the order of the node and the subsequent adjacent node;

remove from the first min-heap any split points that are linked to the nodes that were swapped; and and generate new splits points.

16. The method of claim 12, further comprising:

iteratively perform the following steps until a termination condition is reached:

move the location of the reference point to a split point that is contained in the first heap;

in the first list, retrieve the node n1 and subsequent adjacent node n2 linked to the split point that is contained in the first heap;

the node n1 being a leaf node in the first partition and the subsequent adjacent node n2 being an internal node in the second partition;

remove the subsequent adjacent node n2 from the first list;

compute each distance of each child node of the subsequent adjacent node n2 from the current location of the reference point;

insert all child nodes of the subsequent adjacent node n2 into the first list, insertion beginning after the original position of the subsequent adjacent node; and continuously maintaining the order in the first list by re-computing and comparing each child nodes' distance to the current location of the reference point and a current entry node's distance to the current location of the reference point, each child node being inserted into the first list before an entry node whose distance to the original location of the reference point is greater than or equal to respective child node's distance to the current location of the reference point, each child node being inserted into the first list after the entry node whose distance to the original location of the reference point is less than the respective child node's distance to the current location of the reference point, and any child node whose distance to the current location of the reference point is greater than each of the existing entry node's distances to the current location of the reference point being inserted into the end of the first list.

17. The method of claim 12, further comprising:

compute the position of the node n1 and subsequent adjacent node n2 by solving an equal distance equation, the two sides of the equation being continuous distance functions that present the current distance between each node n1, n2 and the current location of the reference point.

18. A system for performing a continuous k-nearest neighbor (CkNN) query in location based services for moving objects, the system comprising:

a computer readable medium comprising instructions that when executed causes at least one processor to:

receive a k-nearest neighbor query from a mobile device, the mobile device comprising the computer readable medium;

continuously receive a location and trajectory of the mobile device, an initial location of the mobile device being a reference point, the position of the reference point matching the position the mobile device along the trajectory;

access a database containing a plurality of interest points surrounding the location and trajectory of the mobile device;

store and index, in computer memory, the plurality of interest points in a spatial tree index;

continuously query the index to compute k-nearest interest points nearest to the reference point;

continuously maintain a queue comprising nodes referencing the k-nearest interest points and a hierarchy of minimal bounding rectangles;

construct a first list to store all nodes of the spatial tree index, each node being ordered by its distance to the current location of the reference point, the list comprising a first partition containing the k-nearest interest points and a second partition containing each node of the queue;

initialize a first min-heap to initially contain split points, computed as follows:

for each node n1 and its subsequent adjacent node n2 in the first list, perform the following procedure, comprising:

given the node n1 and its subsequent adjacent node n2, detect a split point in the mobile device's trajectory, a split point being a point whose position has equal distances from the two nodes n1, n2 respectively;

add the split point nearest to the current position of the reference point to the first heap; and continuously maintain the split points in the first heap as ordered by their distance to the current location of the reference point and link each split point to each pair of nodes in first list from which each split point was computed;

iteratively perform the following steps until a termination condition is reached:

move the location of the reference point to a split point that is contained in the first heap;

in the first list, retrieve the node n1 and subsequent adjacent node n2 linked to the split point that is contained in the first heap, the node n1 and the subsequent adjacent node n2 being both in the second partition;

swap the order of the node n1 and the subsequent adjacent node n2;

remove from the first min-heap any split points that are linked to the nodes that were swapped; and generate new splits points; and continuously return to the mobile device, the k-nearest interest points.

* * * * *

UNITED STATES PATENT AND TRADEMARK OFFICE
CERTIFICATE OF CORRECTION

PATENT NO. : 10,331,753 B1  
APPLICATION NO. : 15/945222  
DATED : June 25, 2019  
INVENTOR(S) : Zhang et al.

Page 1 of 1

It is certified that error appears in the above-identified patent and that said Letters Patent is hereby corrected as shown below:

On the Title Page

Item (71) Applicant is corrected to read:
-- Mingjin Zhang, Miami, FL;
Naphtali Rishe, Miami Beach, FL;
Weitong Liu, Redwood City, CA;
Jahkell Lazarre, Miami, FL --.

Signed and Sealed this
Twenty-second Day of October, 2019

Andrei Iancu
*Director of the United States Patent and Trademark Office*